US012055049B1

(12) United States Patent
Bridges

(10) Patent No.: US 12,055,049 B1
(45) Date of Patent: Aug. 6, 2024

(54) ENERGY RECOVERY SYSTEM TO BE USED IN NATURAL GAS PIPELINES

(71) Applicant: Willard P. Bridges, Colleyville, TX (US)

(72) Inventor: Willard P. Bridges, Colleyville, TX (US)

( * ) Notice: Subject to any disclaimer, the term of this patent is extended or adjusted under 35 U.S.C. 154(b) by 0 days.

(21) Appl. No.: 17/711,332

(22) Filed: Apr. 1, 2022

Related U.S. Application Data

(60) Provisional application No. 63/169,703, filed on Apr. 1, 2021.

(51) Int. Cl.

| | |
|---|---|
| ***F01D 15/10*** | (2006.01) |
| ***F01D 1/02*** | (2006.01) |
| ***F17D 1/02*** | (2006.01) |

(52) U.S. Cl.
CPC .............. *F01D 15/10* (2013.01); *F01D 1/02* (2013.01); *F17D 1/02* (2013.01)

(58) Field of Classification Search
CPC ............ F03B 17/062; F17D 1/02; F03D 3/02
See application file for complete search history.

(56) References Cited

U.S. PATENT DOCUMENTS

2010/0308591 A1* 12/2010 Godfrey .................. F03B 13/00 290/54

FOREIGN PATENT DOCUMENTS

CN 107701243 A * 2/2018
KR 101753537 B1 * 7/2017

* cited by examiner

*Primary Examiner* — Christopher R Legendre
(74) *Attorney, Agent, or Firm* — Richard Eldredge; Leavitt Eldredge Law Firm

(57) ABSTRACT

An energy recovery system places fans inside a pipe that carries natural gas or another fluid so that as the fluid passes over them, they rotate. As the fans rotate, they cause a generator to create electricity from the rotation. The fans thereby remove energy from the natural gas so that it reaches a pressure, velocity, or temperature that it is able to be consumed at.

1 Claim, 6 Drawing Sheets

ENERGY RECOVERY SYSTEM TO BE USED IN NATURAL GAS PIPELINES

BACKGROUND

1. Field of the Invention

The present invention relates generally to power generation systems and methods, and more specifically, to an energy recovery system to be used in natural gas pipelines that reduces the head within a natural gas flow so that it is ready for use. The reduction in the head also produces rotational energy that is converted to electricity.

2. Description of Related Art

Power generation systems are well known in the art and are effective means to convert one form of energy to another such as the combustion of fuel to produce linear or rotational energy within an engine or motor. Common power generation systems include pipelines that transport oil and natural gas from ports, and production centers to refineries, powerplants, and consumption centers. For example, in the United States, there are 210 natural gas pipelines and over 1400 natural gas compressor stations, according to the EIA. Each of these compressor stations is, in and of itself, a power generating unit. However, the energy these units produce is wasted. These compressor stations produce millions of horsepower that is used to create pressure which moves the natural gas to its destination. The destination is either an electric power generating plant or a municipal natural gas grid. In both cases, the pressure produced by compressor stations is bled off because the natural gas power grid and the electric power generating plant cannot handle such high pressures of natural gas.

One of the problems associated with common power generation systems is their limited efficiency. For example, the energy used to raise the pressure of the natural gas within the pipeline for its movement that is then released into the environment or otherwise bled off is wasted.

Accordingly, although great strides have been made in the area of power generation systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
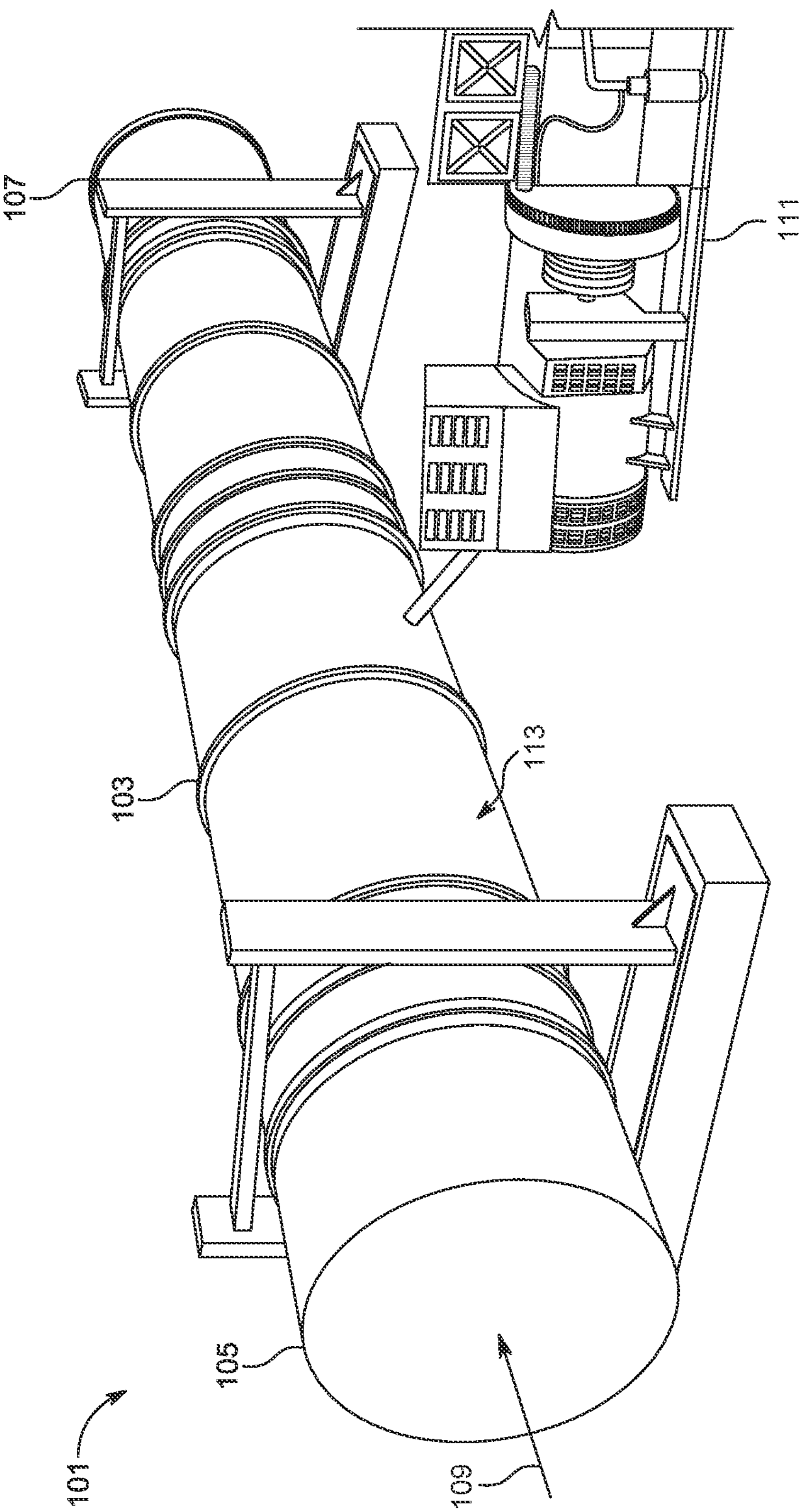
FIG. 1 is a front perspective view of an energy recovery system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional power generation systems. Specifically, the present invention captures the energy of a fluid flow within a pipe while the pressure is reduced within the pipe in preparation for its use. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a front perspective view of an energy recovery system in accordance with a preferred embodiment of the present application. It will be appreciated that system 101 overcomes one or more of the above-listed problems commonly associated with conventional power generation systems.

In the contemplated embodiment, system 101 includes pipe 103 with an entrance 105 and an exit 107 thereto. A fluid flow 109 passes through pipe 103 from entrance 105 to exit 107. A generator 111 is in mechanical communication with a shaft that extends out from the side surface 113 of pipe 103.

Figure 2:
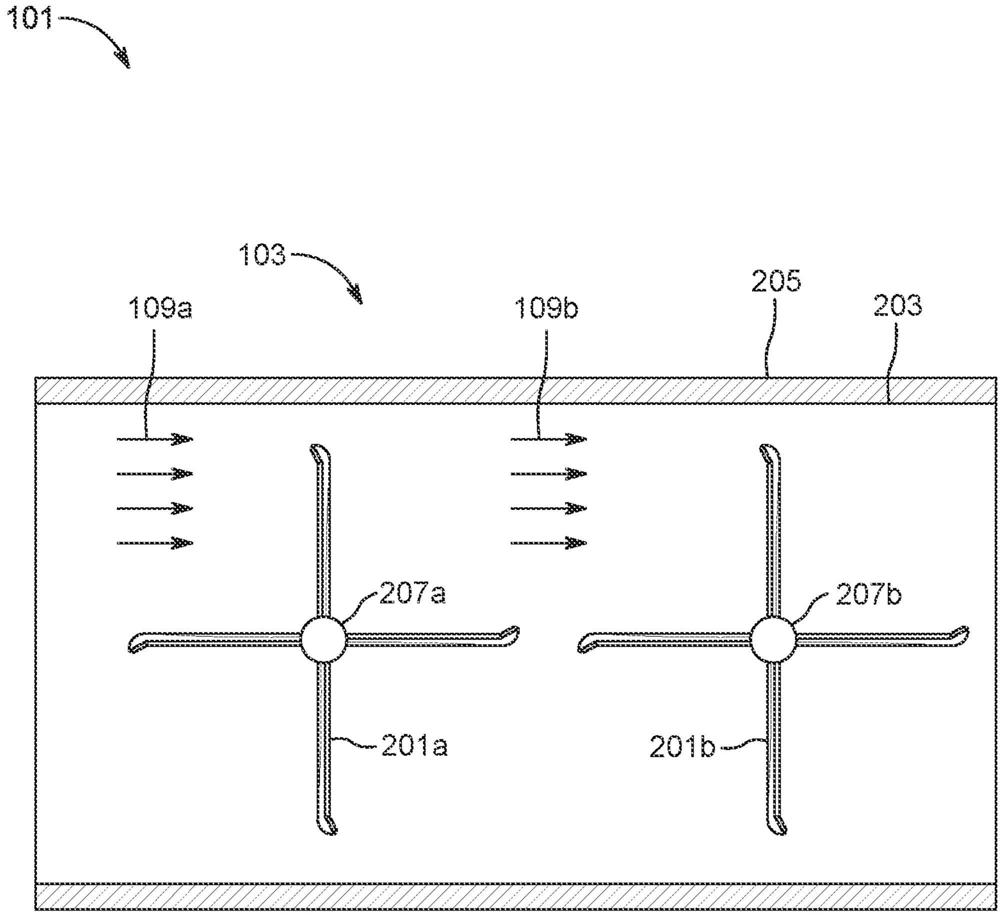
FIG. 2 is a cross-sectional side view of the interior of the pipe of FIG. 1.
Figure 3:
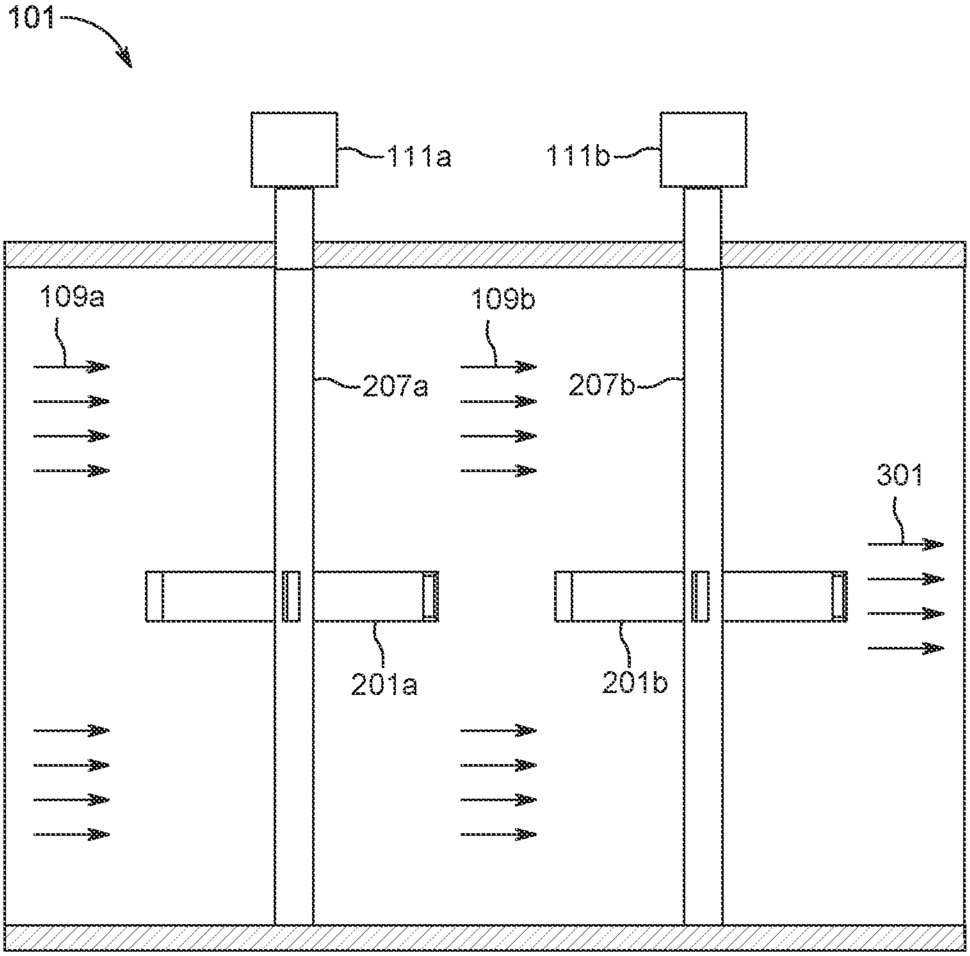
FIG. 3 is a cross-sectional top view of the interior of the pipe of FIG. 1.

Referring to FIG. 2 system 101 is further depicted and includes a space 203 within a body 205 that forms pipe 103. Shafts 207 are attached to body 205 and support fans 201 thereon. Fans 201 are configured to extend in fluid flow 109 and rotate shaft 207. It is contemplated that fans 201, as depicted by FIG. 3, are configured to reduce the pressure of fluid flow 109 by a prescribed amount so that fluid flow 109 creates a velocity stream 301 near exit 107 of pipe 103.

In use, fans 201 are placed on shafts 207 within pipe 103 which contains fluid flow 109. As fluid flow 109 passes over fans 201, fans 201 rotate and pass the rotation to the shafts 207 that they are attached to, the rotation leaves pipe 103 to generator 111 where it is converted to electricity. The electricity is sent to a power grid or the like for use. The pressure of fluid flow 109 at entrance 105 is conducive to the movement of fluid flow 109 and after fans 201 extract energy from fluid flow 109, the pressure near exit 107 is more conducive to the consumption of the fluid of fluid flow 109.

It should be appreciated that one of the unique features believed characteristic of the present application is that the energy held in fluid flow 109 that must be removed for the use of the fluid is extracted and recovered by fans 201, shafts 207, and generator 111.

Figure 4:
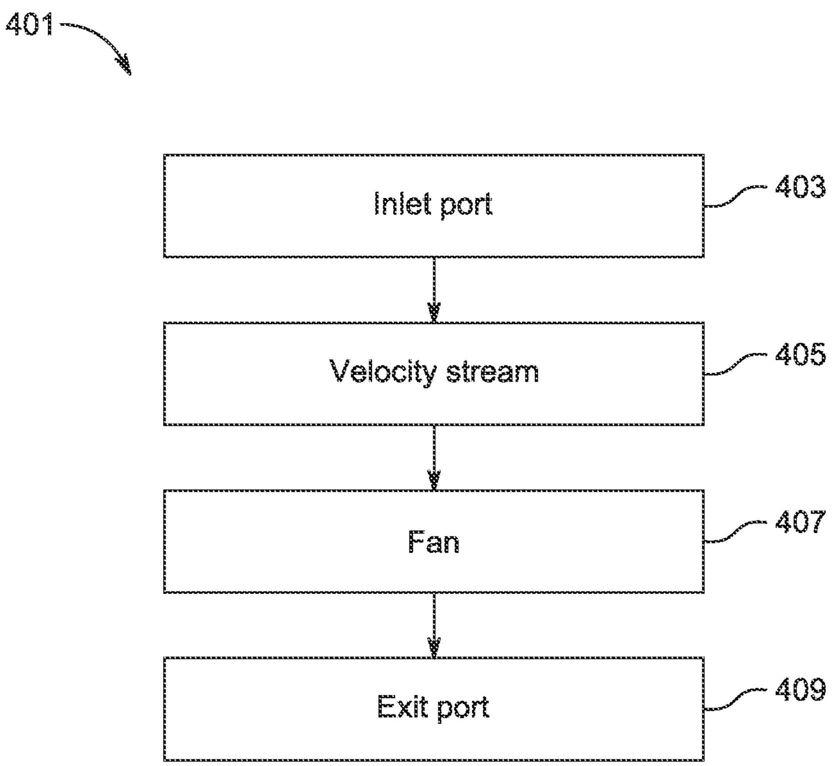
FIG. 4 is a diagram of the system of FIG. 1.
Figure 5:
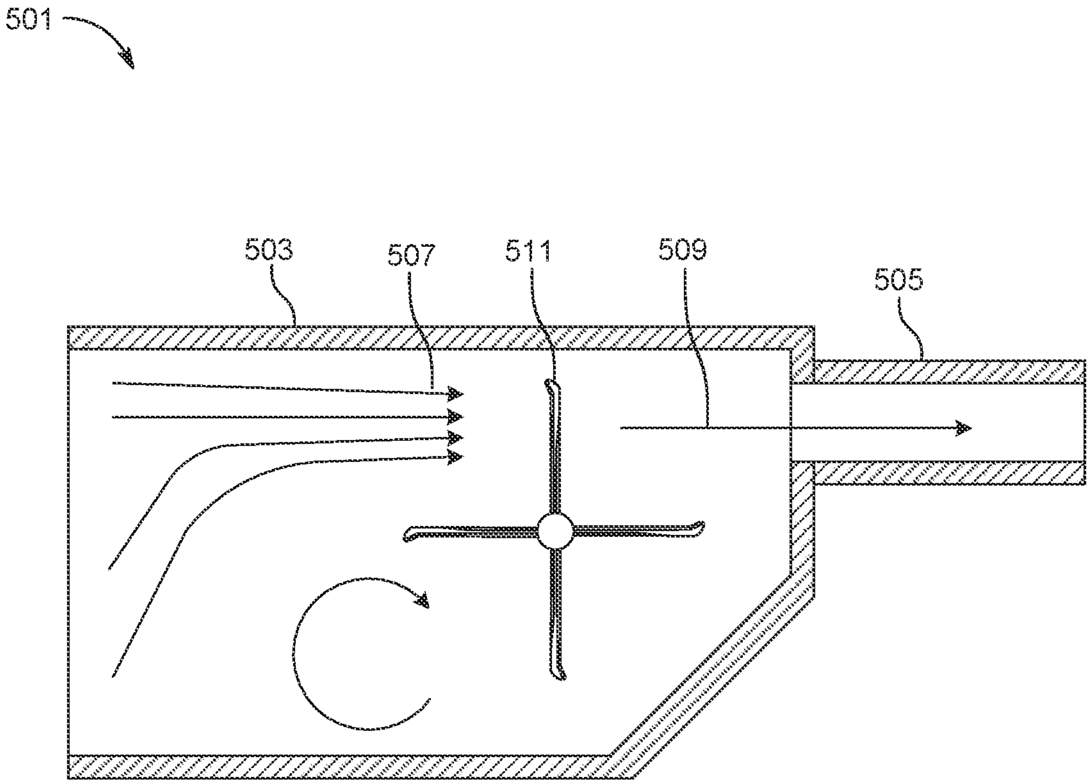
FIG. 5 is a cross-sectional side view of the velocity stream of FIG. 4.

Referring now to FIG. 4, an alternative embodiment of system 101 is depicted. Embodiment 401 includes an inlet port 403 that provides a fluid flow to a velocity stream 405 prior to its interaction with fan 407. In this embodiment, the fluid flow is prepared prior to fans so that the fans 407 receive the prepared fluid flow prior to an exit port 409.

The preferred embodiment of the formation of a velocity stream is further depicted. Embodiment 501 includes a larger diameter pipe 503 in fluid communication with a smaller diameter pipe 505. Smaller diameter pipe 505 is attached to larger diameter pipe 503 in the middle towards the top thereof. The attachment as described channels a fluid flow 507 so that is contacts with the blade of a fan 511 so that the fan only sees the force of fluid flow 507. The result is a velocity stream 509 that pushes the blade of a fan 511 to create electricity.

Figure 6:
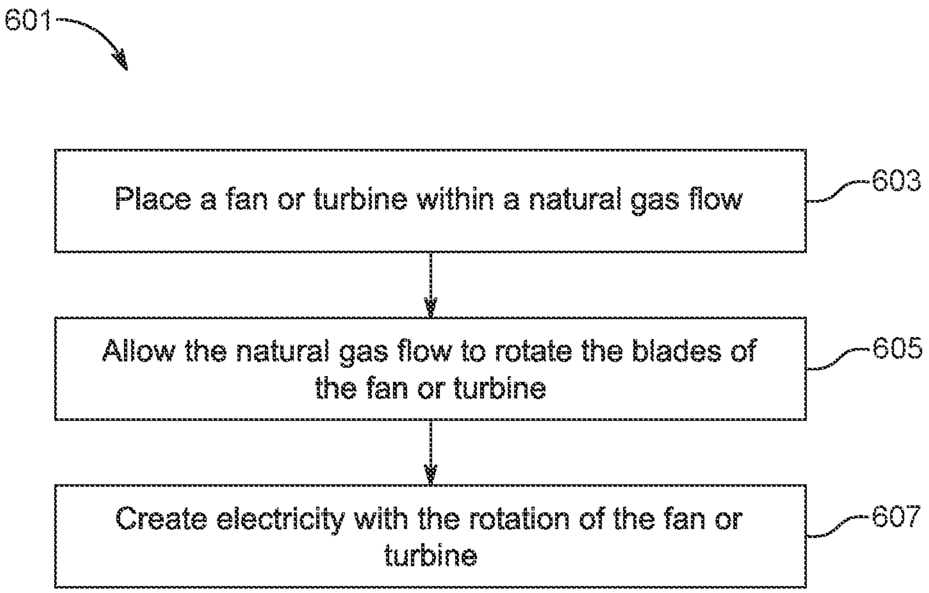
FIG. 6 is a flowchart of a method of reducing pressure within a pipe.

Referring now to FIG. 6 a method of reducing pressure within a pipe is depicted. Method 601 includes placing a fan or turbine within a natural gas flow 603 such as in a pipe or tube, allowing the natural gas to flow to rotate the blades of the fan or turbine 605 where the natural gas contacts the fan or turbine at high pressure and is reduced as the fan or turbine rotate, and creating electricity with the rotation of the fan or turbine 607.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. An energy recovery system comprising:

a pipe that has a body that encloses a space therein and has an entrance and an exit, the pipe is a natural gas pipeline that transfers natural gas, the pipe having a first pipe section and a second pipe section, the first pipe section has a greater diameter than a diameter of the second pipe section, a first diameter of the first pipe section gradually tapers, in a direction from the entrance to the exit, to a second diameter of the first pipe section, and wherein the second diameter is greater than the diameter of the second pipe section and the second pipe section has a centerline that is offset from a centerline of the first pipe section;

wherein the natural gas passes through the first pipe section to the second pipe section to create a velocity stream from the first pipe section to the second pipe section;

a fan attached to a shaft within the space of the pipe, the fan has a plurality of vanes, the shaft extends through the body, the fan is positioned within the first pipe section;

wherein a portion of the plurality of vanes extend through the velocity stream, which in turn causes rotational movement of the fan;

at least one generator rotatably attached to the shaft, wherein rotation of the at least one generator creates electricity; and wherein the natural gas exits the pipe at a lower pressure than it entered it.

* * * * *